United States Patent Office 3,149,100
Patented Sept. 15, 1964

3,149,100
REACTIVE TRIAZINE DYES
Peter Hindermann, Basel, Hans Peter Kölliker, Basel Land, Jürg Ammann, Basel, and André Pugin, Riehen, near Basel, Switzerland, assignors to J. R. Geigy A.-G., Basel, Switzerland
No Drawing. Filed Apr. 29, 1960, Ser. No. 25,549
Claims priority, application Switzerland, Apr. 30, 1959, 72,771
6 Claims. (Cl. 260—153)

The instant invention is concerned with so-called reactive dyes, viz. dyes which are apt to be chemically fixed on certain textile fibres such as natural and regenerated cellulose fibres, silk and wool and also on leather. Another feature of the invention is to provide methods for the manufacture of the new dyes and methods for their use for producing wet-fast dyes especially on cellulose. The invention also comprises fast-dyed materials produced with the new dyes.

It is well known that sulphonated textile dyes containing a chloro-s-triazinylamino substituent may be chemically fixed on cellulose fibres by the action of acid binding agents which create a link between the dyestuff and the cellulose by a divalent oxygen atom which connects the triazine ring with the cellulose structure. The reactivity greatly depends on the number of chlorine atoms present at the s-triazinylamino substituent of the dyes. Thus, dyes with only one chlorine substituent at an s-triazinylamino substituent are relatively stable and may be fixed at elevated temperatures by varied acid binding agents such as alkali metal hydrogen carbonates, alkali metal carbonates, trialkali metal phosphates etc. On the other hand, dyes with two chlorine substituents at an s-triazinylamino substituent are much more reactive and may be fixed on cellulose already at room or slightly elevated temperatures by the action of appropritaely selected acid binding agents, but these are less stable on storing. However, if only one chlorine substituent of the dichloro-s-triazinylamino substituent is replaced by a hydroxy group as the result of an undesired hydrolysis, the reactivity is greatly reduced and bad results are obtained on trying to fix partly hydrolysed dyes on cellulose even under the conditions usual for the dyes containing a monochloro-s-triazinylamino group mentioned above.

It is the concept of the invention to provide new reactive dyes wherein the advantage of simple performance of dyeing associated with dichloro-s-triazinylamino-substituted sulphonated dyes is combined with the stability of monochloro-s-triazinylamino-substituted dyes, which new dyes, therefore, may be used according to whatever known method of dyeing is desired.

In the broadest aspect, the new dyes correspond to the general formula

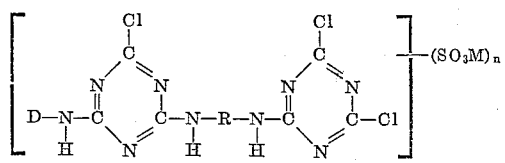

wherein

D represents a monovalent organic radical imparting dyestuff chaarcteristics,
R represents a divalent organic radical,
M represents hydrogen or an alkali metal or ammonium cation, and
n represents a positive whole number of at least 2 and at most 6, preferably 2 to 4.

Although in the broadest aspect of the invention D—NH— may represent the radical of any sulphonated dye containing a condensable amino group which may belong, e.g. to the class of nitro, azo, anthraquinone or phthalocyanine dyes, we prefer dyes of the above formula wherein D represents an organic radical imparting dyestuff characteristics which dyestuff is selected from the group consisting of monoazo and 1-amino-4-arylaminoanthraquinone dyes.

In the preferred dyes, more specifically defined, D represents a member selected from the group consisting of 4-phenylazophenyl, 4-naphthylazophenyl, 3-(o-hydroxynaphthylazo)-phenyl, 4-(o-hydroxynaphthylazo)-phenyl, 3-(1'-aryl-5'-hydroxypyrazolyl-4'-azo)-phenyl, o-phenylazohydroxynaphthyl, 3 - (1' - aminoanthraquinonyl - 4'-amino)-phenyl, 4-(1'-aminoanthraquinonyl - 4' - amino)-phenyl and 4-(1'-aminoanthraquinonyl-4'-amino)-diphenylyl(4')radicals.

Also, although R in the broadest aspect of the invention may represent the radical of any organic compound containing two condensable amino groups which may belong, e.g. to the aliphatic, isocyclic-aromatic, heterocyclic, araliphthatic or alicyclic series, by far the most preferred dyes are those wherein R represents a divalent organic radical selected from the group consisting of 1.4- and 1.3-phenylene radicals.

The 2 to 6 sulphonic acid groups may be substituents of the organic dye constituent as well as of R. In azo dyes, the sulphonic acid groups may be bound to isocyclic aromatic nuclei which form part either of the diazo or the coupling component and, in anthraquinone dyes, sulphonic acid groups may be attached to the anthraquinone ring system as well as to substituents thereof such as external aromatic ring, for example to phenylamino and diphenylamino substituents. It is evident that apart from sulphonic acid groups, the aromatic nuclei in the dyes according to the invention may contian further substituents usual in organic dyes, e.g. halogen, lower alkyl, lower alkoxy, hydroxy, amino (inclusive of organically substituted amino), acylamino and carboxylic acid groups.

The reactive dyestuffs according to the invention are thus characterised in that, at triazine rings which are spatially separated by —NH—R—NH—, there are mobile substituents—and at one hetero ring only one such substituent but at the other there are two such substituents. Thus, because of this characteristic construction, there are two centres of different reactivity in the dyestuffs according to the invention.

In the following the cyanuric chloride radical will always be expressed by "Cy$_1$" or "Cy$_2$."

The reactive dyestuffs according to the invention are obtained by reacting 1 mol of a dyestuff containing an amino group with 2 mol of cyanuric chloride and with 1 mol of a diaminobenzene compound corresponding to H$_2$N—R—NH$_2$. It is of advantage if, in the diaminobenzene compound, the one amino group reacts quickly and the other more slowly. For example one amino group can be sterically hindered and/or of weakened basicity. This one amino group is given such properties advantageously by O-substitution, in particular by O-substitution with acid groups, mainly the sulphonic acid group. Thus, 1.3- and 1.4-diaminobenzene-6-sulphonic acids in particular are very suitable components for the construction of dyestuffs according to the invention.

The preferred method for the production of dyestuffs according to the invention consists of the following reactions:

1 mol of a water soluble organic colour component containing one amino group is first reacted with 1 mol of cyanuric chloride under mild conditions. 1 mol of a diamino compound corresponding to H$_2$N—R—NH$_2$ is reacted under mild conditions with the condensation product obtained which contains two mobile substituents at the heterocyclic radical. Then this condensation product is reacted with a further mol of cyanuric chloride.

A modification of this process for the production of reactive dyestuffs according to the invention consists in first reacting 1 mol of a diamino compound corresponding to $H_2N-R-NH_2$ under mild conditions with 1 mol of cyanuric chloride, then condensing the reaction product with one mol of a dyestuff corresponding to D containing an amino group and finally condensing this product with a further mol of cyanuric chloride.

A further modification of the process for the production of reactive dyestuffs according to the invention consists in reacting first 1 mol of a diaminobenzene compound with 2 mol of cyanuric chloride and then reacting the reaction product with one mol of the dyestuff corresponding to D containing one amino group.

Finally, the process for the production of reactive dyestuffs according to the invention can also be performed in such a manner that components are used for the construction of the dyestuff which contain the characteristic radical $-Cy_1-R-Cy_2$ or the radical $-Cy_1$ and if the later radical is used, then reacting the dyestuff with a diaminobenzene compound and with one mol of cyanuric chloride. These processes are particularly useful for the production of azo dyestuffs according to the invention, the critical substituent being in either the diazo or the coupling component.

In all reactions with the cyanuric chloride, the usual precautionary measures are advisable in order to avoid reactive chlorine atoms which should remain in the dyestuff molecule being exchanged too soon. The temperature and pH conditions should be adapted to the mobility of the substituents to be replaced. Thus, for example, the first chlorine atom of the cyanuric chloride should be exchanged at low temperatures of up to at most 20° and the second chlorine atom at medium temperatures of 25–50° C. Alkali metal salts of low aliphatic acids, e.g. sodium acetate or sodium formate, are used with advantage as acid buffering agents in the first step. Also neutral alkali metal salts of polyacids can be used, in particular also the alkali metal salts of polysulphonated starting dyestuffs. Also the neutralisation of the reaction mixtures must be performed with the necessary precautions. For this purpose advantageously dilute solutions of alkali carbonates or alkali bicarbonates are used, the neutralisation is performed at low temperatures and pH values of the reaction mixtures of over 6.5–7.0 are avoided. Also the reaction products must be isolated and dried with the necessary care.

In the advantageously water soluble organic colour component D, the water solubilising group is chiefly the sulphonic acid group. Some of the acid water solubilising groups can be in the form of the free acid, but generally they are advantageously in the form of their lithium, sodium, potassium or ammonium salts.

If D is an azo dyestuff, then it is principally the radical of a monoazo dyestuff. Suitable aminoazo dyestuffs advantageously contain two to three sulphonic acid groups. The amino group to be coupled with the cyanuric chloride can be an actual component of aromatic radicals bound by the azo group or it can be in external substituents, for example in aminobenzoylamino groups.

Aminoazo dyestuffs used according to the invention can be produced by the usual methods, for example from nitro-arylazo dyestuffs or nitrobenzoylaminoarylazo dyestuffs by reduction of the nitro groups; also by coupling aryldiazonium compounds with aromatic amines coupling in the p-position to an acylatable amino group; in addition by coupling with aminoaryl pyrazole compounds such as 1-aminophenyl-5-pyrazolones or -5-aminopyrazoles, and by coupling with aminonaphthol sulphonic acids and derivatives thereof having a modified amino group, e.g. an aminobenzoylated amino group. Here, particularly valuable dyestuffs are those obtained from 1-hydroxy-naphthalene-3-sulphonic acids coupled in the 2-position with diazobenzene-o-sulphonic acids, which hydroxynaphthalene compounds containing an amino group or an aminobenzoylamino group in the 5-, 6-, 7- or 8-position can also be further substitued, e.g. still further sulphonated.

When producing dyestuffs according to the invention using dyestuff components which already contain the characteristic radical $-Cy_1-NH-R-NH-Cy_2$, the main diazo components are 1-amino-3- or 4-substituted aminobenzene-6-sulphonic acids whereby the substituted amino group contains the characteristic radical or an aminobenzoyl group is substituted by the characteristic radical. Examples of coupling components having the characteristic radical given above are aminonaphthalene sulphonic acids, particularly the aminonaphthalene sulphonic acids mentioned in the previous paragraph, as well as 1-(aminophenyl)-pyrazolone compounds coupling in the 4-position. These components contain the characteristic substituent bound direct to the amino group or to the amino group of an aminobenzoylamino substituent. As has already been explained above, only a part of the characteristic substituent can be present and it can be fully formed only in the dyestuff molecule.

Also if F is the radical of an anthraquinone dyestuff, the characteristic substituent $-Cy_1-NH-R-NH-Cy_2$ is not directly at the anthraquinone structure but, for example at nuclearly bound phenylamino or diphenylamino groups. The acid water solubilising groups, in particular the sulphonic acid groups, however, can be present as substituents of the anthraquinone radical and as substituents at external aryl radicals of nuclearly bound groups, for example as substituents in one of the groups listed above. Anthaquinone dyestuffs according to the invention are derived from 1.4-diaminoanthraquinone having an aromatically substituted amino group and from derivatives correspondingly substituted in the nucleus, e.g. from 2-, 5-, 6- and 7-halogen-, 5- or 8-hydroxy, 5- or 6-alkyl sulphonyl-, 5- or 6-trifluoromethyl- derivatives, particularly, however, from 1.4-diaminoanthraquinone-2-mono- or -2.5-, -2.6-, -2.7- or -2.8-disulphonic acids, mainly however, from 1-amino-4-phenylamino-anthraquinone-2-sulphonic acid.

The dyestuffs according to the invention having good water solubility are suitable for attaining wet fast dyeings on organic substrata containing hydroxyl groups, in particular on cellulose material, by impregnating the material with aqueous dyestuff solutions and fixing in the presence of acid binding agents. The impregnating liquors can contain the additives usual in dyeing, for example inorganic neutral metal salts such as sodium chloride and sodium sulphate, also wetting, dispersing, levelling or thickening agents, acid amides such as urea or low fatty acid amides and, possibly, also hydrophilic organic solvents. Basic dissociating alkali metal salts of inorganic polyacids, e.g. the lithium, sodium or potassium salts of phosphoric acids, carbonic acids, boric acids, silicic acids and, possibly, even dilute solutions of alkali hydroxides are mainly used as acid binding fixing agents. Because of their characteristic structure, the dyestuffs according to the invention are distinguished by a hitherto unattained multiplicity of uses as, after most of the fixing processes known up to now, i.e. wet or dry, cold or hot, they can be fixed equally well. Their use, therefore, is not limited to particular apparatus or specific dyeing instructions. The cellulose dyeings attained with the new dyestuffs are distinguished by a relatively very slight loss in strength on soaping.

The dyestuffs according to the invention are suitable for attaining fast dyeings on organic substrata having nucleophilic groups, in particular for the dyeing of keratine fibres such as wool and for the dyeing of leather.

Further details regarding the processes for the production of the dyestuffs according to the invention can be seen from the following examples which illustrate but do not limit the invention in any way. In the examples, where not otherwise stated, parts are given as parts by weight and the temperatures are in degrees centigrade. The relationship of parts by weight to parts by volume is as that of grammes to millilitres.

EXAMPLE 1

42.1 parts of the aminoazo dyestuff of the formula

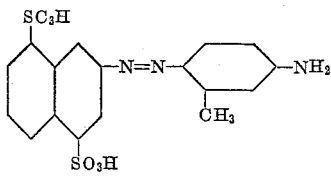

are dissolved in 800 parts of water and the reaction is made neutral with sodium carbonate. This solution is added dropwise within 2 hours at 0–2° to an aqueous, finely dispersed suspension of 22 parts of cyanuric chloride obtained by pouring the cyanuric chloride solution in 150 parts of acetone onto ice water. As soon as no more starting dyestuff can be traced, the dyestuff solution is made weakly acid (pH value 6.0–6.5) by carefully dropping in a dilute sodium carbonate solution at 0–2°. The dyestuff of the formula

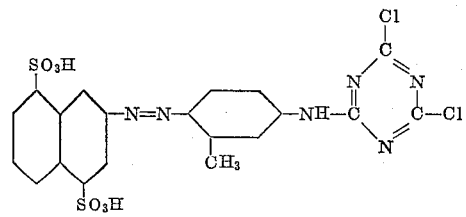

is separated by the addition of sodium chloride, filtered off, washed with dilute sodium chloride solution and, without drying, is dissolved in 800 parts of water. A neutral solution of 18.8 parts of 1.3-diaminobenzene-6-sulphonic acid in 500 parts of water is added to this solution and the whole is then warmed to 40–45° until the pH value of the reaction mixture remains stable. The dyestuff of the formula

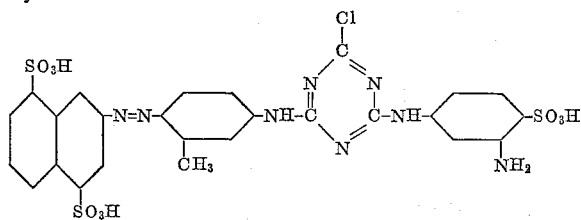

is precipitated by the addition of sodium chloride, filtered off, washed in dilute sodium chloride solution and again dissolved in 800 parts of water at a pH of 6.5–7.0. This solution is added dropwise within 2 hours at 0–2° to an aqueous, finely dispersed suspension of 22 parts of cyanuric chloride. As soon as no more free amino groups can be traced, the dyestuff of the formula

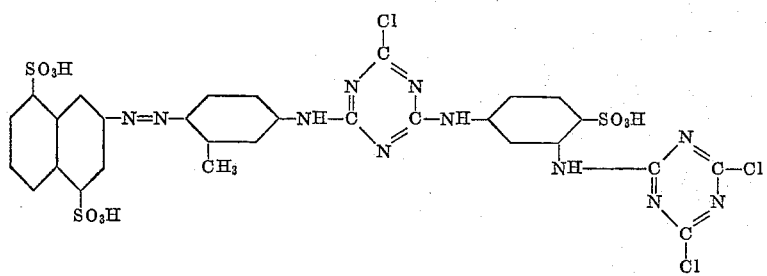

is salted out, filtered off, washed with dilute sodium chloride solution and dried in the vacuum. The dyestuff is a brown powder which dissolves in water with a yellow and in concentrated sulphuric acid with a red colour.

If cotton is impregnated in the Foulard with a 2% solution of this dyestuff, dried, then treated with a solution which contains 1% of caustic soda lye and 30% of sodium chloride and then steamed for 5 minutes at 100–103°, then rinsed and soaped at the boil for 30 minutes, then a level, wet fast, yellow dyeing is obtained.

The colour strength and the fastness properties of the cellulose dyeings are to a great extent independent of the variables in the dyeing method; similar results are also obtained at fixing temperatures of from 20° C. upto 100° C.

If, instead of the 42.1 parts of the aminoazo dyestuff given above, a corresponding number of parts of the aminoazo dyestuffs given in the following table are used and if 18.8 parts of the aromatic diamines given in the table are used and the condensation is performed under similar conditions with a slight excess of cyanuric chloride, then dyestuffs are obtained the cellulose dyeings of which have similarly good properties.

Table

| No. | Aminoazo dyestuff | Diamino compound | Shade on cotton |
|---|---|---|---|
| 1 | 2-aminonaphthalene-4.8-disulphonic acid ⟶ 1-amino-2-methoxy-5-methylbenzene. | 1.3-diaminobenzene-6-sulphonic acid. | Yellow. |
| 2 | 2-aminonaphthalene-4.8-disulphonic acid ⟶ 1-amino-3-acetylaminobenzene. | ...do... | Do. |
| 3 | 2-aminonaphthalene-4.8-disulphonic acid ⟶ aminobenzene. | ...do... | Do. |
| 4 | 2-aminonaphthalene-3.6-disulphonic acid ⟶ 1-amino-3-methylbenzene. | 1.4-diaminobenzene-6-sulphonic acid. | Do. |
| 5 | 2-aminonaphthalene-6.8-disulphonic acid ⟶ 1-amino-3-acetylaminobenzene. | ...do... | Do. |
| 6 | 2-aminonaphthalene-6.8-disulphonic acid ⟶ 1-amino-2-methoxy-5-methyl-benzene. | 1.3-diaminobenzene-6-sulphonic acid. | Do. |
| 7 | 2-aminonaphthalene-3.6-disulphonic acid ⟶ 1-amino-3-ethoxybenzene. | ...do... | Do. |
| 8 | 2-aminonaphthalene-4.8-disulphonic acid ⟶ N-methylaminobenzene. | ...do... | Do. |
| 9 | 1-aminobenzene-2.5-disulphonic acid ⟶ 1-amino-3-acetylaminobenzene. | ...do... | Do. |
| 10 | 1-aminobenzene-2-carboxylic acid-4-sulphonic acid ⟶ 1-amino-3-carbomethoxyaminobenzene. | 1.4-diaminobenzene-6-sulphonic acid. | Do. |
| 11 | 6-methyl-2-(4'-aminophenyl)-benz-thiazole-3'.7'-disulphonic acid ⟶ 1-amino-3-methylbenzene. | 1.3-diaminobenzene-6-sulphonic acid. | Do. |
| 12 | Mixture of 3-aminopyrene-5.8-disulphonic acid and 3-aminopyrene-5.10-disulphonic acid ⟶ 1-amino-3-methylbenzene. | ...do... | Yellow-orange. |
| 13 | 2-aminonaphthalene-4.8-disulphonic acid ⟶ 1-amino-3-methylbenzene. | 1.4-diaminobenzene-6-sulphonic acid. | Yellow. |
| 14 | ...do... | 1.3-diaminobenzene-6-sulphonic acid. | Do. |

EXAMPLE 2

18.8 parts of 1.3-diaminobenzene-6-sulphonic acid with the addition of sodium carbonate are, in the form of the sodium salt, dissolved in 300 parts of water with a neutral reaction. This solution is gradually added dropwise at 0–3° to an aqueous, finely dispersed suspension of 20.3 parts of cyanuric chloride, obtained by pouring a solution of cyanuric chloride in 150 parts of acetone onto ice water. The reaction is complete when the pH value of the solution remains stable, which is in about 1 hour. The dissolved condensation product is diazotised of 0° with 25 parts of 30% hydrochloric acid and 6.9 parts of sodium nitrite and the diazonium compound formed is coupled, at a slightly acid reaction of the solution, with a solution of 34.8 parts of the disodium salt of 1-hydroxynaphthalene-4.6-disulphonic acid in 300 parts of water. On completion of the coupling, the dyestuff of the formula

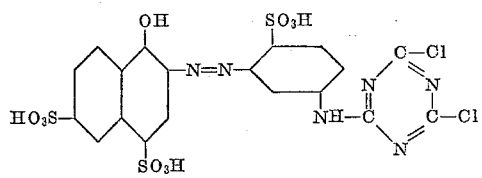

is separated with sodium chloride, filtered off, washed with dilute sodium chloride solution and, without drying, dissolved in 800 parts of water. A neutral solution of 18.8 parts of 1.4-diaminobenzene-3-sulphonic acid in 300 parts of water is added to this solution and the whole is heated to 40–45° until the pH value of the reaction mixture remains stable. The dyestuff of the formula

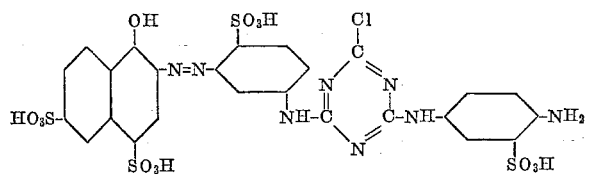

is precipitated by the addition of sodium chloride, filtered off, washed with dilute sodium chloride solution and again dissolved in 800 parts of water at a pH of 6.5–7.0. This solution is added dropwise at 0–2° and within 2 hours to an aqueous finely dispersed suspension of 22 parts of cyanuric chloride. As soon as no more free amino groups can be traced, the dyestuff of the formula

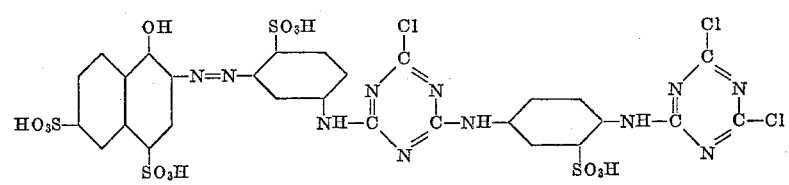

is salted out, filtered off, washed with dilute sodium chloride solution and dried in vacuo. The dyestuff is a brown-red powder which dissolves in water with a scarlet colour.

If cotton is treated in the Foulard at 20° with a 2% aqueous solution of the above dyestuff, which solution also contains 15 parts of sodium carbonate per litre, and is then rolled up and left for 2 hours, then rinsed and soaped at the boil for 30 minutes, a very level scarlet dyeing is obtained which is wet fast. The advantage of the new dyestuff lies in the fact that it can be fixed with equally good results onto cellulose fibres by the hot dyeing process.

If, instead of the 34.8 parts of 1-hydroxynaphthalene-4.6-disulphonic acid, equal parts of 1-hydroxynaphthalene-3.6-disulphonic acid, 1-hydroxynaphthalene-3.8-disulphonic acid, 1-hydroxynaphthalene-4.8-disulphonic acid, or 2-hydroxynaphthalene-3.6-disulphonic acid are used and otherwise the same procedure as above is followed, then dyestuffs having similar good properties are obtained.

EXAMPLE 3

18.8 parts of 1.3-diaminobenzene-6-sulphonic acid are dissolved in the form of the sodium salt, in 200 parts of water by the addition of sodium carbonate. The solution has a pH of 6.5–7 and is added dropwise within 1 hour at 0–4° to a finely dispersed suspension of 18.45 parts of cyanuric chloride in ice water. The reaction is complete when the pH of the solution remains stable, which is in about 1 hour.

The dissolved condensation product is diazotised at 0° with 25 parts of 30% hydrochloric acid and 6.9 parts of sodium chloride and the diazonium compound formed is coupled, at a weakly acid reaction of the solution, with a solution of 27.6 parts of the sodium salt of 1-phenyl-3-methyl-5-pyrazolone-4'-sulphonic acid in 250 parts of water. On completion of the coupling, the dyestuff of the formula

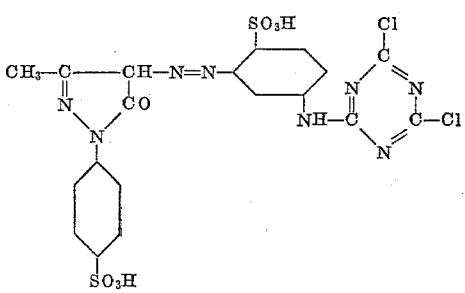

is separated with sodium chloride, filtered off and washed with dilute sodium chloride solution. The moist dyestuff is then again dissolved in 800 parts of water. A neutral solution of the sodium salt of 18.8 parts of 1.4-diaminobenzene-6-sulphonic acid in 500 parts of water is added dropwise to the dyestuff solution at 40–45° and within 1 hour. Sufficient sodium chloride is added to the solution formed of the dyestuff of the formula

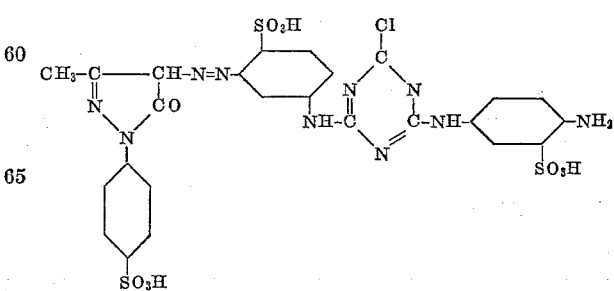

to precipitate it. The dyestuff is filtered off and washed with a little sodium chloride solution. The moist dyestuff is dissolved by the addition of sodium carbonate in 500 parts of water with a neutral reaction and this solution is added dropwise within 1 hour at 0–4° to a finely dispersed suspension of 18.45 parts of cyanuric chloride in ice water. When no more diazotisable amino groups can be traced, the dyestuff

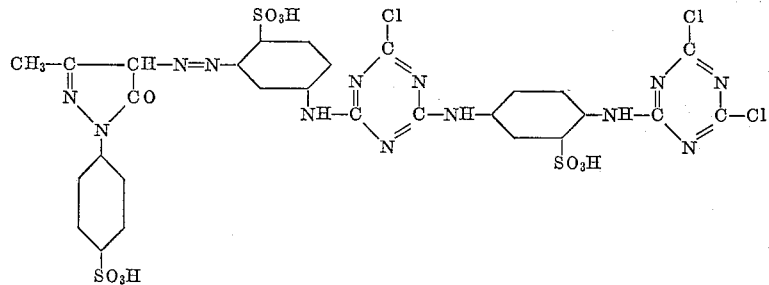

is salted out with sodium chloride, filtered off, washed with sodium chloride solution and dried in the vacuum. The dried dyestuff is a deep yellow powder which dissolves in water and in concentrated sulphuric acid with a yellow colour.

If cotton is impregnated in a Foulard at 50° with a 1% solution of this dyestuff which contains 20 g. of sodium carbonate per litre, exposed to a heat of 95° for 2 hours, rinsed and then soaped at the boil for 30 minutes—only a little dyestuff being washed away—then a yellow dyeing which has good wet fastness properties is obtained.

At lower Foulard temperatures and at fixing temperatures between 45 and 90°, dyeings of the same shade and colour strength which have equally good fastness properties are obtained.

If, in the above example the 27.6 parts of coupling component are replaced by a corresponding number of parts of the coupling components given in the following table and if 18.8 parts of the diamines given are used and the procedure is otherwise analogous to that described in this example, then dyestuffs are obtained which have similarly good fastness properties.

*Table*

| Coupling component | Diamine | Shade |
|---|---|---|
| 1-(2'-chloro-5'-sulphophenyl)-3-methyl-5-pyrazolone. | 1.3-diaminobenzene-6-sulphonic acid. | Yellow. |
| 1-(3'-sulphophenyl)-3-methyl-5-iminopyrazole. | ----do---- | Do. |
| 1-phenyl-3-methyl-5-pyrazolone-2'.5'-disulphonic acid. | 1.4-diaminobenzene-6-sulphonic acid. | Do. |

EXAMPLE 4

31.9 parts of 1-amino-8-hydroxynaphthalene-3.6-disulfonic acid are dissolved with sodium carbonate in the form of the sodium salt in 200 parts of water. The solution has a pH of 6–6.5 and is then added dropwise within 1 hour at 0–2° to a finely dispersed suspension of 18.45 parts of cyanuric chloride in water. The reaction is complete when no more diazotisable amino groups can be traced.

The reaction product is precipitated with sodium chloride, filtered off, washed with sodium chloride solution and then immediately dissolved again in 350 parts of water. 30 parts of sodium acetate are added to this solution and then, within half an hour, a solution of 17.3 parts of diazotised 1-aminobenzene-2-sulphonic acid is poured in. As soon as the coupling is complete, the dyestuff, which has partly precipitated, of the formula

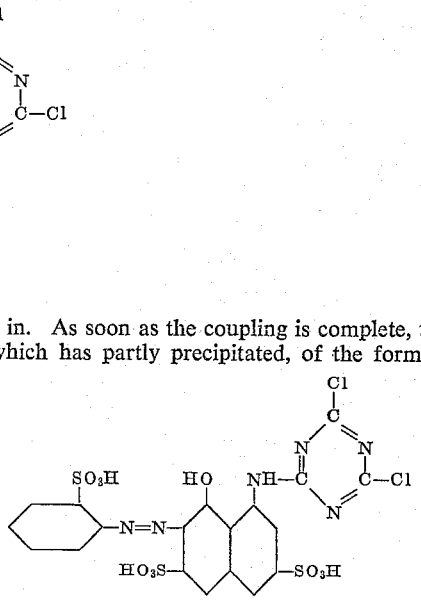

is converted into its sodium salt by careful neutralisation with diluted sodium carbonate solution, and in this form it is completely precipitated with sodium chloride. The precipitate is filtered off and well washed with sodium chloride solution. The moist filter cake is again dissolved in 600 parts of water.

A neutral solution of the sodium salt of 18.8 parts of 1.3-diaminobenzene-6-sulphonic acid in 500 parts of water is added dropwise to this solution at 40–45° within 1½ hours. The mixture is stirred for another 2½ hours at this temperature until the starting dyestuff has disappeared. The condensation product of the formula

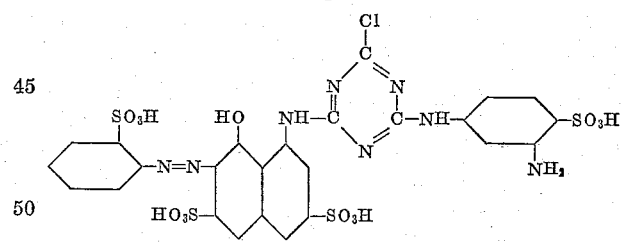

is precipitated by salting out with sodium chloride, filtered off, washed with sodium chloride solution and again dissolved with a neutral reaction in 400 parts of water.

This solution is added dropwise at 0–4° within 1 hour to a suspension of 18.45 parts of cyanuric chloride in 1000 parts of ice water. The reaction is complete when the pH value of the reaction mixture remains stable. The end product of the formula

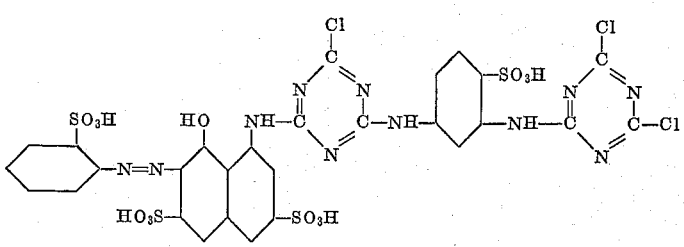

after careful neutralisation with sodium carbonate solution, is precipitated in the form of the sodium salt by the addition of sodium chloride. It is filtered off, washed with sodium chloride solution and dried in vacuo.

The dyestuff is a dark red powder which dissolves in water with an intensive red and in concentrated sulphuric acid with a blueish red colour.

To produce wet fast dyeings, cotton is treated in the foulard at 50° with an aqueous solution containing 2% dyestuff, 20% urea and 2% sodium carbonate, squeezed out, dried and then fixed for 5 minutes at 140–160°, rinsed and then soaped at the boil for 30 minutes. Deep red shades which are fast to wet and light are obtained.

The colour strength is not reduced if considerably lower fixing temperatures are used or even if dyeing is performed by the usual soda-alkaline dyeing process at 20–50°, the urea being replaced by 100 g. per litre of sodium chloride.

If the 31.9 parts of the coupling component used in the above example are replaced by a corresponding number of parts of the components given in the following table in the form of their triazinyl compounds and if the amines given in the table as diazonium compounds and 18.8 parts of the diamines given in the table are used and the condensation is performed in an analogous manner with the amounts of cyanuric chloride mentioned in the example, then dyestuffs are obtained which have similar properties and with which cellulose dyeings having similar fastness properties are obtained.

soon as no more starting dyestuff can be traced, the dyestuff solution is made weakly acid (pH 6.0–6.5) by the careful addition dropwise of a dilute sodium carbonate solution at 0–2°. The dyestuff of the formula

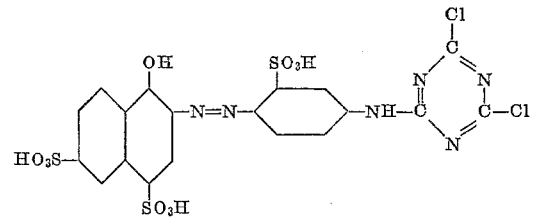

is salted out, filtered off, washed with dilute sodium chloride solution and dissolved, while still moist, in 800 parts of water. A neutral solution of the sodium salt of 18.8 parts of 1.3-diaminobenzene-4-sulphonic acid in 300 parts of water is added to this solution and the whole is then heated at 40–45° until the pH value of the reaction mixture is stable. The dyestuff of the formula

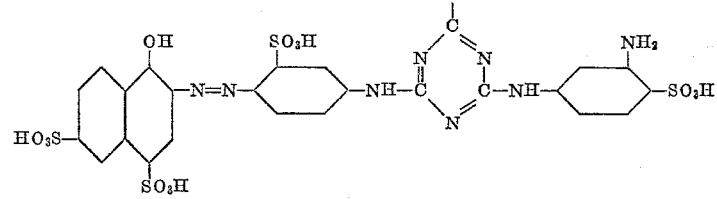

is precipitated with sodium chloride, filtered off, washed with sodium chloride solution and again dissolved in 800 parts of water at a pH of 6.5–7.0. This solution is added

Table

| No. | Diazonium compound from— | Coupling component | Diamine | Shade on cotton |
|---|---|---|---|---|
| 1 | 1-amino-4-methylbenzene-2-sulphonic acid. | 1-(2'.4'-dichloro-1'.3'.5'-triazinyl-(6')-amino)-8-hydroxynaphthalene-3.6-disulphonic acid. | 1.3-diamino-benzene-6-sulphonic acid. | Red. |
| 2 | 1-aminobenzene-2-sulphonic acid. | 2-(2'.4'-dichloro-1'.3'.5'-triazinyl-(6')-amino)-8-hydroxynapththalene-6-sulphonic acid. | do | Orange. |
| 3 | do | 2-(2'.4'.-dichloro-1'.3'.5'-triazinyl-(6')-amino)-5-hydroxynaphthalene-7-sulphonic acid. | do | Do. |
| 4 | 1-amino-4-acetyl-amino-benzene-2-sulphonic acid. | do | do | Do. |
| 5 | 1-aminobenzene-2-sulphonic acid. | 1-(2'.4'-dichloro-1'.3'.5'-triazinyl-(6')-aminobenzoylamino)-8-hydroxy-naphthalene-3.6-disulphonic acid. | do | Red. |
| 6 | do | do | 1.4-diamino-benzene-6-sulphonic acid. | Do. |

EXAMPLE 5

50.3 parts of the aminomonoazo dyestuff obtained by coupling diazotised 1-amino-4-nitrobenzene-6-sulphonic acid with 1-hydroxynaphthalene-4.6-disulphonic acid and 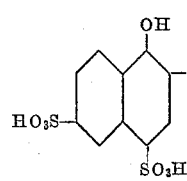 reducing the nitro group with sodium sulphide, are dissolved in 800 parts of water. The pH is adjusted to 6.5–7.0 with sodium carbonate. This solution is added dropwise within 2 hours at 0–3° to an aqueous, finely dispersed suspension of 22 parts of cyanuric chloride. As dropwise at 0–3° and within 2 hours to an aqueous, finely dispersed suspension of 22 parts of cyanuric chloride. As soon as no more free amino groups can be traced, the new dyestuff of the formula

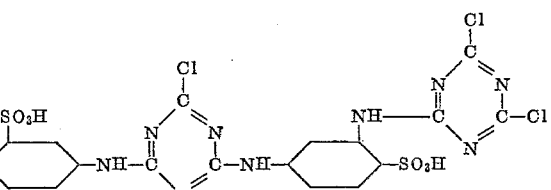

is salted out, filtered off, washed with sodium chloride solution and dried in vacuo. The dyestuff is a brown powder which dissolves in water with a red colour.

If cotton is impregnated with a 2% aqueous solution of the dyestuff which contains 20% urea and 2% sodium carbonate, and is then squeezed out and fixed for 5 minutes at 140–160°, then after rinsing and soaping, a level, red, wet-fast dyeing is obtained. The dyestuff can be fixed on cellulose fibres with equally good results by other known methods.

If, instead of the 50.3 parts of the aminomonoazo dyestuff mentioned in the above example, equal parts of the aminomonoazo dyestuff produced by coupling diazotised 1-amino-4-nitrobenzene-6-sulphonic acid with 1-hydroxynaphthalene-3.6-disulphonic acid, or with 1-hydroxynaphthalene-3.8-disulphonic acid, or with 1-hydroxynaphthalene-4.8-disulphonic acid or with 2-hydroxynaphthalene-3.6-disulphonic acid and reducing the nitro group with sodium sulphide are used and otherwise the procedure described in this example is followed, then dyestuffs having similar good properties are obtained.

EXAMPLE 6

53.3 parts of the sodium salt of the anthraquinone dyestuff of the formula

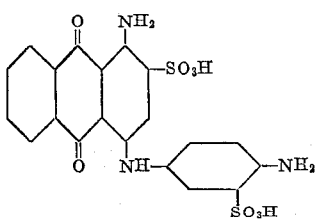

are dissolved in 750 parts of water with a neutral reaction. This solution is added dropwise within 1 hour at 0–4° to a finely dispersed suspension of 19.37 parts of cyanuric chloride in ice water. The mixture is further stirred for another hour at 0–4°, after which time the starting dyestuff has completely reacted. The blue dyestuff formed of the formula

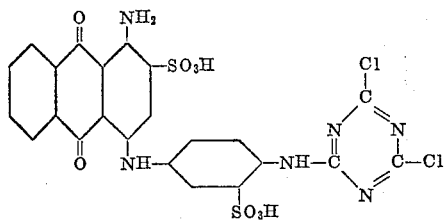

is precipitated by the addition of sodium chloride after carefully neutralising the solution to the pH 6.5–7.0. The dyestuff is filtered off and washed with diluted sodium chloride solution. The filter cake is dissolved in 1500 parts of water.

This solution is added dropwise within 1 hour at 40–45° to a solution which is neutral at first of the sodium salt of 18.8 parts of 1.4-diaminobenzene-6-sulphonic acid in 500 parts of water. As soon as the pH of the reaction mixture remains stable, the sodium salt of the dyestuff of the formula

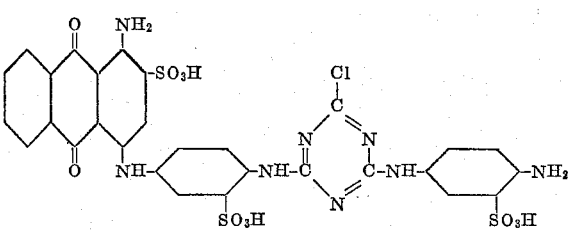

is precipitated by the addition of sodium chloride, filtered off, washed with diluted sodium chloride solution and again dissolved in 1500 parts of water with a neutral reaction. This solution is again added dropwise within 1 hour at 0–4° to an aqueous, finely dispersed suspension of 18.83 parts of cyanuric chloride.

As soon as the starting dyestuff can no longer be traced and the pH of the reaction mixture remains stable, the solution of the dyestuff of the formula

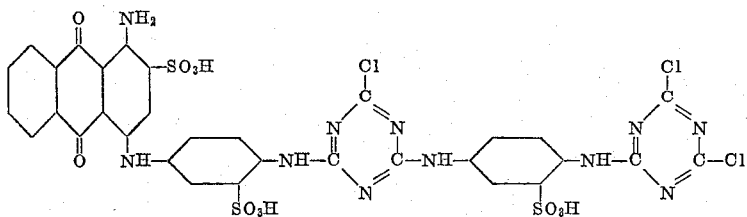

is carefully neutralised with sodium carbonate solution to a pH of 6.5–7.0. The dyestuff is then salted out, filtered off, washed with sodium chloride solution and dried in vacuo.

The dyestuff is a dark blue powder which dissolves in water with a blue and in concentrated sulphuric acid with a bordeaux red colour.

Cotton is treated in the Foulard at 40° with a 2% aqueous solution of the above dyestuff, which solution contains 15 parts of sodium carbonate per litre, rolled up, left for 2 hours, then rinsed and soaped at the boil for 30 minutes. In this way a blue dyeing with good wet fastness properties is obtained in this way. The same result can be obtained on using a hot dyeing process.

If, instead of the 53.3 parts of the dyestuff mentioned above, a corresponding number of parts of the dyestuffs named in the following table are used and 18.8 parts of the diamines given are used and the condensation is performed under corresponding conditions with the calculated amount or a slight excess of cyanuric chloride, then dyestuffs are obtained, the cellulose dyeings of which have similarly good fastness properties.

Table

| No. | Anthraquinone dyestuff | Diamine | Shade on cotton |
|---|---|---|---|
| 1 | 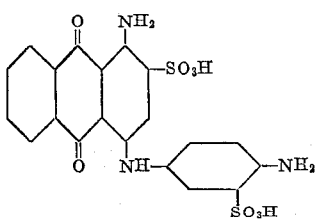 | 1.3-diaminobenzene-6-sulphonic acid | Blue. |

Table—Continued

| No. | Anthraquinone dyestuff | Diamine | Shade on cotton |
|---|---|---|---|
| 2 | 1-NH₂, 2-SO₃H, 5(or 8)-SO₃H anthraquinone, 4-NH-(cyclohexyl-cyclohexyl)-NH₂ with SO₃H | 1.3-diaminobenzene-6-sulphonic acid. | Greenish blue. |
| 3 | 1-NH₂, 2-SO₃H, 6-HO₃S anthraquinone, 4-NH-cyclohexyl-NH₂ with SO₃H | 1.4-diaminobenzene-6-sulphonic acid. | Green-blue. |
| 4 | 1-NH₂, 2-COOH anthraquinone, 4-NH-cyclohexyl-NH₂ with SO₃H | 1.3-diaminobenzene-6-sulphonic acid. | Blue. |
| 5 | 1-NH₂, 2-SO₃H anthraquinone, 4-NH-cyclohexyl-NH(CH₃) with SO₃H | ----do---- | Do. |
| 6 | 1-NH₂, 2-SO₃H, 6-HO₃S anthraquinone, 4-NH-(cyclohexyl-cyclohexyl)-NH₂ with SO₃H | ----do---- | Greenish blue. |
| 7 | 1-NH₂, 2-SO₃H, 6-HO₃S anthraquinone, 4-NH-(cyclohexyl-cyclohexyl)-NH₂ with SO₃H | 1.4-diaminobenzene-6-sulphonic acid. | Green-blue. |
| 8 | 1-NH₂, 2-SO₃H, 5(or 8)-HO₃S anthraquinone, 4-N=cyclohexyl-NH₂ with SO₃H | 1.3-diaminobenzene-sulphonic acid. | Greenish blue. |

EXAMPLE 7

A neutral solution of the sodium salt of 18.8 parts of 1.3-diaminobenzene-6-sulphonic acid in 250 parts of water is poured within half an hour at 0–2° into a finely dispersed, aqueous suspension of 18.45 parts of cyanuric chloride and this solution is added dropwise, without isolating the intermediate product, to a solution of 56.9 parts of 1-amino-4-(4'-aminophenylamino)-anthraquinone-2.3'.6-trisulphonic acid in 600 parts of water which has been made neutral with sodium carbonate, the addition being made at 40–45° within 2 hours.

After a further hour at this temperature, the dyestuff of the formula

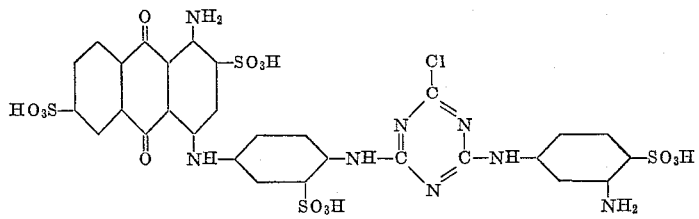

is salted out, filtered off and washed with dilute sodium chloride solution. While still moist it is then dissolved in 700 parts of water with a neutral reaction and this solution is added dropwise within 1 hour to a finely dispersed, aqueous suspension of 18.45 parts of cyanuric chloride.

After stirring for a further hour at this temperature, the pH of the solution does not change any more, i.e. the condensation is complete. The sodium salt of the dyestuff of the formula

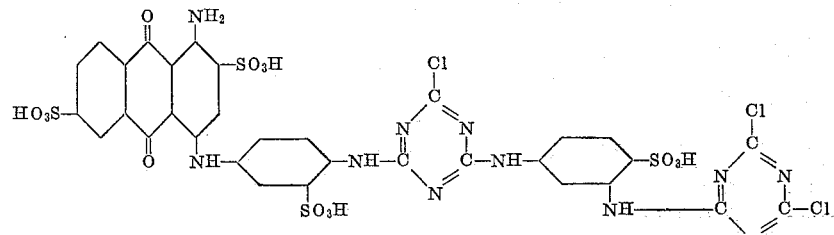

is precipitated with sodium chloride, filtered off, washed with dilute sodium chloride and dried in vacuo. It is a dark blue powder which dissolves in water with a greenish blue and in concentrated sulphuric acid with a dull violet colour.

If cotton is impregnated at 40° with a 2% aqueous solution of the dyestuff which solution also contains 20% urea and 2% sodium carbonate, squeezed out and fixed for 5 minutes at 140–160°, then after rinsing and soaping, a level, strongly greenish blue, wet-fast dyeing is obtained. The dyestuff can also be fixed on to cellulose fibres with equally good results under other known application conditions including the cold dyeing process.

What we claim is:

1. A dyestuff of the formula

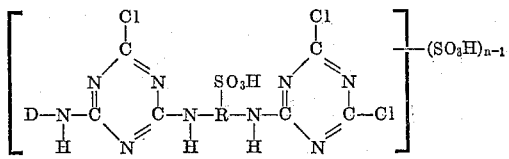

wherein

D represents a member selected from the group consisting of 4-phenylazo-phenyl, 4-naphthylazo-phenyl, 3-(o-hydroxynaphthylazo)-phenyl, 4-(o-hydroxynaphthylazo)-phenyl, 3-(1'-phenyl-5'-hydroxypyrazolyl-4'-azo)-phenyl, o-phenylazo-hydroxynaphthyl, 3-(1'-aminoanthraquinonyl-4'-amino)-phenyl, 4-(1'-aminoanthraquinonyl-4'-amino)-phenyl and 4-(1'-aminoanthaquinonyl-4'-amino)-diphenylyl-(4'), R represents a divalent organic radical selected from the group consisting of 1.4-phenylene and 1.3-phenylene, and $n$ is a positive whole number of at least 2 and at most 6.

2. The dyestuff of the formula

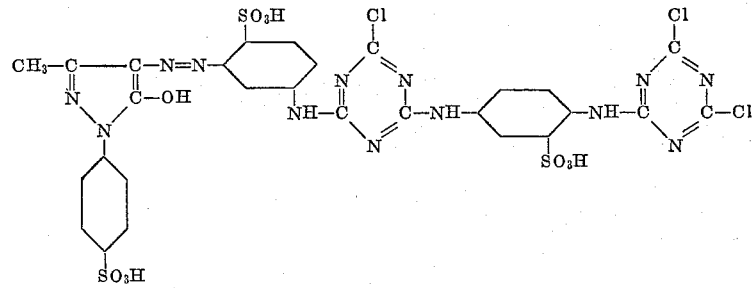

3. The dyestuff of the formula

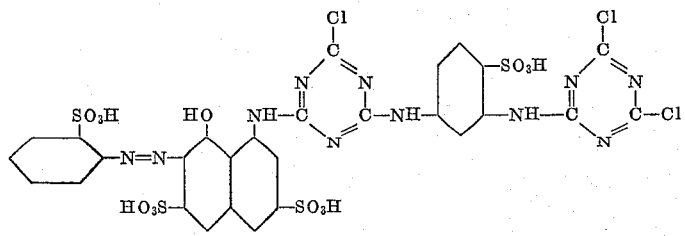

4. The dyestuff of the formula
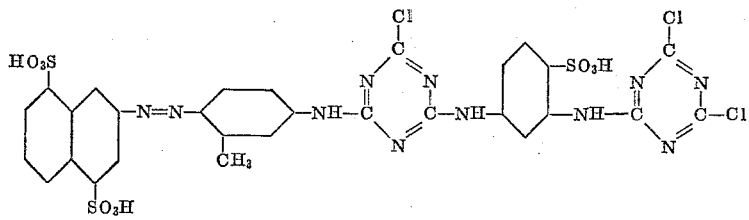
5. The dyestuff of the formula
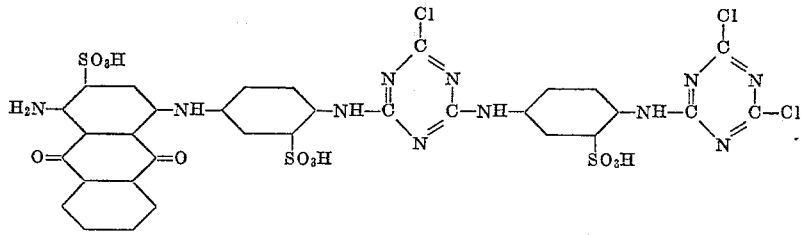
6. The dyestuff of the formula
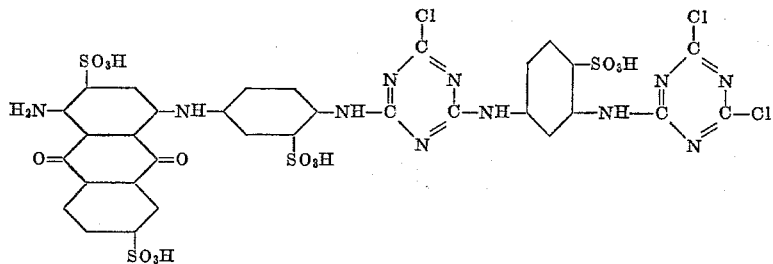
References Cited in the file of this patent
UNITED STATES PATENTS
| | | |
|---|---|---|
| 1,625,531 | Fritzsche et al. | Apr. 19, 1927 |
| 1,625,532 | Fritzsche et al. | Apr. 19, 1927 |
| 1,886,480 | Haller et al. | Nov. 8, 1932 |
| 2,167,804 | Gubler et al. | Aug. 1, 1939 |
| 2,339,739 | Blackshaw et al. | June 18, 1944 |
| 2,940,812 | Denyer et al. | June 14, 1960 |
| 3,007,762 | Wegmann et al. | Nov. 7, 1961 |
FOREIGN PATENTS
| | | |
|---|---|---|
| 552,910 | Belgium | May 24, 1957 |
| 466,886 | Great Britain | June 4, 1937 |
| 774,925 | Great Britain | May 15, 1957 |
| 781,930 | Great Britain | Aug. 28, 1957 |
| 785,222 | Great Britain | Oct. 23, 1957 |